Dec. 2, 1941.   F. G. OXLAND   2,264,677
REGULATING VALVE
Filed Nov. 30, 1940   2 Sheets-Sheet 1

Inventor
Fred G. Oxland
by Roberts Cushman & Woodberry
att'ys.

Dec. 2, 1941.  F. G. OXLAND  2,264,677
REGULATING VALVE
Filed Nov. 30, 1940   2 Sheets-Sheet 2
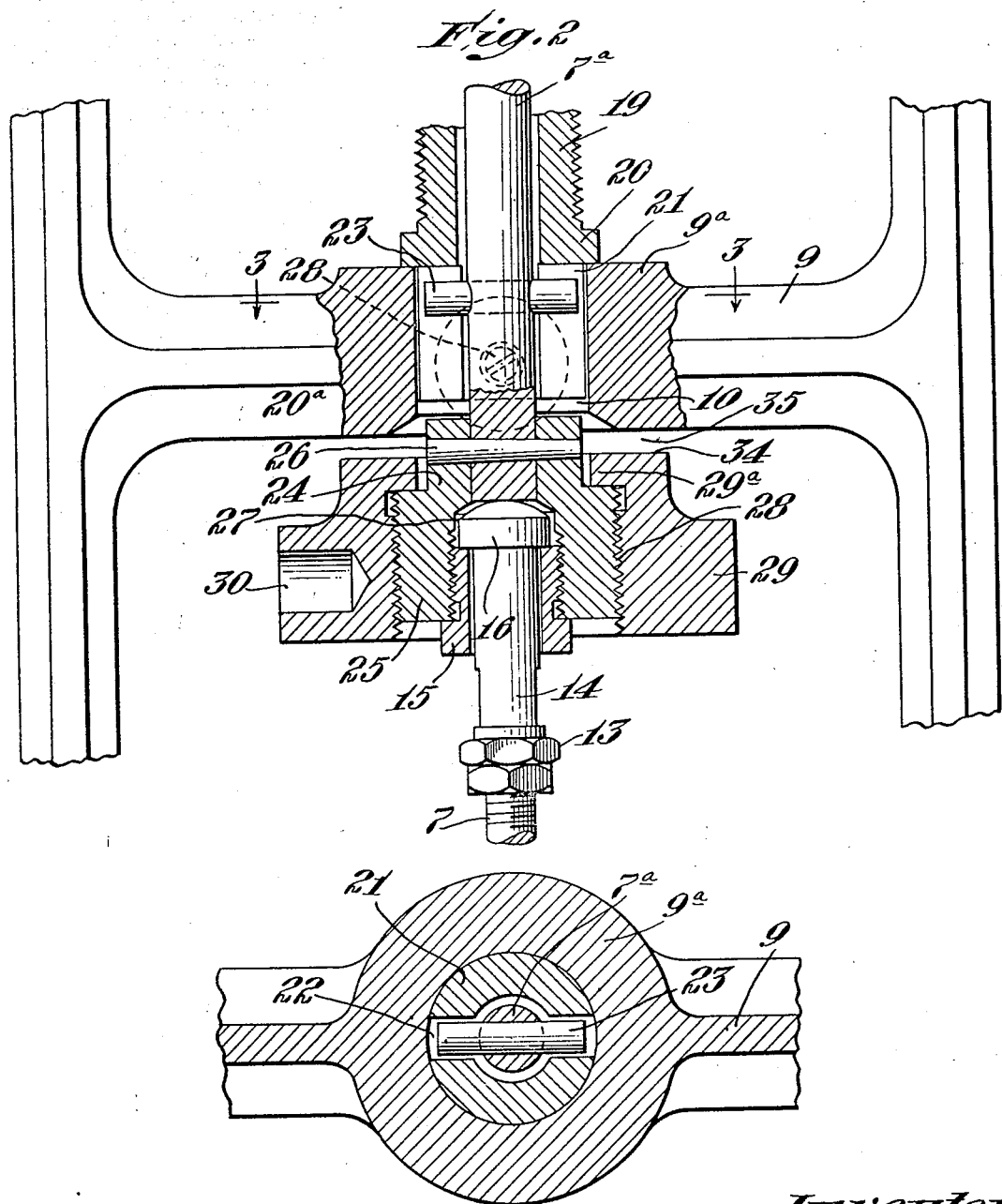
Inventor
Fred G. Oxland
by Roberts Cushman & Woodberry
attys.

Patented Dec. 2, 1941

2,264,677

UNITED STATES PATENT OFFICE 2,264,677

REGULATING VALVE

Fred G. Oxland, Bridgeport, Conn., assignor to Manning, Maxwell & Moore, Incorporated, New York, N. Y., a corporation of New Jersey Application November 30, 1940, Serial No. 367,891

3 Claims. (Cl. 137—153)

This invention pertains to valves and relates more particularly to automatically actuated valves employed for regulating the flow of fluid in a conduit and wherein the valve is normally opened and closed by a pressure motor responsive to temperature or pressure variations.

Valves of this type commonly comprise a balanced main valve and an easily movable pilot valve so designed that when it opens it unbalances the pressure on the main valve and thereby permits the latter to open. Customarily the pilot valve is moved by means of a diaphragm or an expansible bellows containing a body of expansible fluid which extends through a conduit and fills the bulb of a thermometer or the like. Upon rise in temperature of the environs of the bulb, the fluid expands and thereby actuates the diaphragm or bellows so as to open the pilot valve. Conversely when the temperature drops the pilot valve closes and the main valve returns to closed position.

It will be apparent that if, for any reason, the pressure motor becomes inoperative, for example due to loss of fluid from the bellows or bulb, or by reason of breakage of the bellows, the pilot valve will remain closed regardless of such changes in temperature or pressure as would normally cause it to open. The main valve will thus remain closed indefinitely, presenting a serious operating hazard since flow through the conduit is thereby cut off. In recognition of this danger it has become more or less standard practice to provide such an automatic regulating valve with a by-pass so that, in the event of failure of the control motor, the by-pass can be opened and the flow of fluid through the conduit controlled manually until proper repairs can be made. However, in some installations, for example on board ship, the crowded conditions and the necessity for minimizing the weight of the parts makes the use of the additional piping for a by-pass objectionable. Under these conditions it has heretofore been proposed to provide the regulator valve itself with a so-called "pull-open" device by means of which the main valve may be opened manually and kept open if desired while the automatic devices are being repaired or renewed.

Some of these prior pull-open devices are wholly satisfactory from the standpoint of operation, but in all instances known to me they are unduly complicated and expensive; add very considerably to the weight of the regulating valve mechanism; project to a considerable distance below the valve proper, thus occupying more space than is desirable; and frequently make it necessary to locate the actuating element at a place which is quite difficult of access. Furthermore, these devices in many instances require a substantial modification of the valve structure itself and are difficult to install and maintain in proper operative condition.

The principal object of the present invention is to provide an improved pull-open device whereby the main valve of the regulating valve structure may be caused to open manually and held in open position for as long a period as may be desired. A further object is to provide a pull-open device which may be applied to valves of existing type without necessitating substantial change in the construction of the valve and which will not interfere in any way with the normal automatic control of the valve. A further object is to provide a pull-open device which does not substantially increase the vertical dimensions of the valve structure to which it is applied; which is extremely simple and comprises but few parts; which is light in weight; which may be made and applied at comparatively low cost; which is durable and dependable; and wherein the actuating element is accessibly located.

Other and further objects and advantages of the invention will be pointed out in the following more detailed description and by reference to the accompanying drawings, wherein—

Fig. 2 is a fragmentary diametrical vertical section, to larger scale, showing details of the pull-open mechanism; and Fig. 3 is a fragmentary section on the line 3—3 of Fig. 2.

Figure 1:
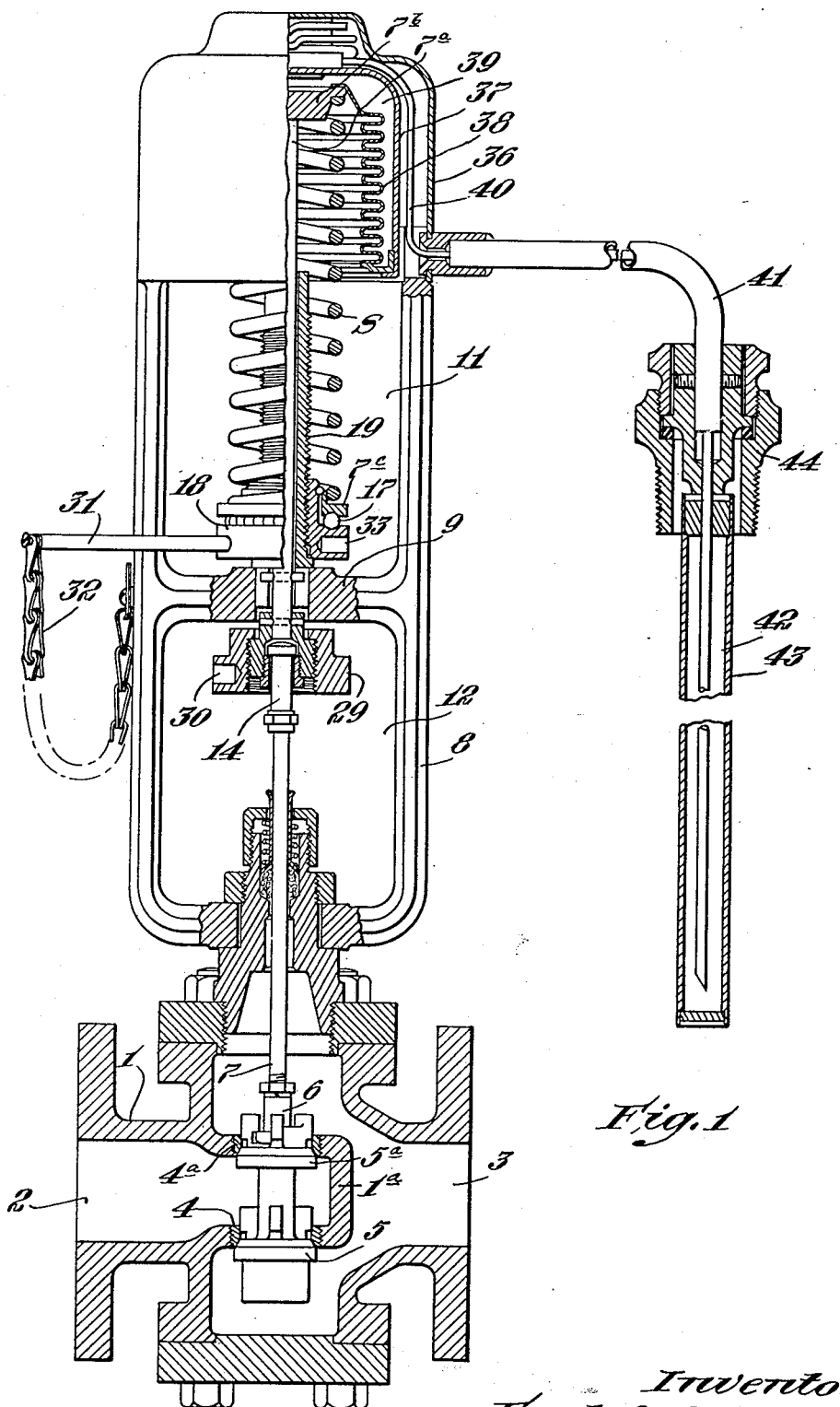
Fig. 1 is a vertical section, partly in elevation, illustrating the improved pull-open device as applied to an automatic regulating valve of a standard type.

Referring to the drawings, the numeral 1 designates the casing of a fluid-flow regulating valve of conventional type having the inlet passage 2 and the outlet passage 3 and the internal septum 1ª providing axially aligned openings in which are fitted the valve seats 4 and 4ª, respectively, with which the spaced heads 5 and 5ª of a balanced main valve cooperate. The main valve is provided with a chamber for the reception of a pilot valve (not shown) having a stem attaching lug 6, the pilot valve being so arranged that when the lug 6 is moved down, the pilot valve is first unseated, thereby unbalancing the pressure upon the spaced heads 5 and 5ª of the main valve, whereupon the unbalanced pressure fully unseats the main valve heads. Pilot-controlled normally balanced valves of this type are common and well known in the art and need not be described in further detail.

The lug 6 to which the pilot valve is connected is secured to the lower end of the stem member 7, the latter extending upwardly, preferably through a stuffing box in the lower part of the bonnet 8. This bonnet is secured to the top of the casing 1 and is here shown as a more or less open frame having the rigid transverse web member 9 provided at its center with a boss 9ª (Figs. 2 and 3) having an aperture 10 through which the valve-actuating stem passes. This transverse member 9 divides the space within the bonnet into upper and lower portions 11 and 12 (Fig. 1), respectively.

The lower stem member 7 is provided at its upper end with a coupling button which is attached to the stem member 7 at the point 13 (Fig. 2) and which comprises the shank portion 14 and the head portion 16, the latter preferably having a spherically curved upper surface. The shank portion 14 passes loosely through an axial bore in a coupling gland 15, the head 16 resting upon the upper end of this gland.

The upper stem member 7ª is axially aligned with the lower stem member 7 and the lower end of the part 7ª engages the spherically curved upper surface of the member 16.

To the upper end of the upper stem member 7ª there is secured the spring abutment 7ᵇ (Fig. 1) with which the upper end of the valve loading spring S is engaged. The lower end of this spring rests upon the lower abutment collar 7ᶜ which in turn rests upon antifriction bearings 17 carried by the spring adjusting collar 18. This spring adjusting collar has screw-threaded engagement with a hollow spring adjusting spindle 19. This spindle 19 is externally screw threaded for engagement with the collar 18 and has a bore of a diameter such as to permit free vertical movement of the stem member 7ª within it. The spindle 19 is provided with a flange 20 at its lower portion which rests upon the upper surface of the hub member 9ª of the transverse web member 9. Below the collar 20 the spindle 19 is provided with an integral cylindrical portion 21 (Fig. 3) which fits snugly within the opening 10 in the hub 9ª and which is provided with diametrically opposed vertical slots 22 (Figs. 2 and 3) which receive the opposite ends of a pin 23 extending transversely through the lower part of the stem member 7ª. The ends of the pin 23 slide freely in the vertical slots 22, and while permitting free vertical movement of the stem member 7ª, prevent rotation of the stem member 7ª with respect to the adjusting spindle 19. The latter is prevented from rotating by means of a set screw 28 having threaded engagement with a transverse hole in the hub 9ª.

The lower part of the stem member 7ª projects downwardly below the hub 9ª and into the bore of the hub portion 24 (Fig. 2) of the stem coupling member 25, the parts 7ª and 24 being fixed together by means of a transverse pin 26. The part 25 is provided with a chamber 27 for the reception of the head 16, the latter being held in position within the coupling member 25 by the gland 15. However, since the part 14 passes loosely through the gland 15 and since the upper surface of the member 16 is spherically curved, it is possible for the upper and lower parts 7ª and 7 of the stem to have a slight relative angular movement to avoid cramping of the upper and lower portions of the stem during the operation of the valve.

In accordance with the present invention the part 25 is externally screw threaded at 28 for the reception of the manually rotatable valve-actuating nut 29, this nut having a free running fit on the screw threads of the part 25. Preferably the member 29 is provided with the flange portion 29ª which overlies the upper surface of the part 25 so as to limit downward movement of the nut 29. Preferably the part 29 is provided with one or more radial socket openings 30 in its periphery for engagement by an actuating pin 31 conveniently connected by means of a chain 32 to the bonnet so that the pin will not be lost. This pin 31 may also be employed for turning the spring adjusting collar 18, the latter being provided with one or more radial sockets 33 in its periphery for the reception of the end of the pin.

Normally the upper surface 34 of the nut 29 is spaced, as indicated at 35, from the under surface of the hub 9ª a distance sufficient to permit the normal up-and-down movement of the valve stem incident to the proper operation of the valve.

The valve mechanism as here disclosed is provided with motor means of a usual type for automatically moving the valve stem and thereby causing the valve to open or close. This motor means comprises the housing 36 which is secured to the upper part of the bonnet 8 and which supports a motor casing comprising the outer substantially rigid shell 37 and the inner collapsible bellows-like shell 38, the shells 37 and 38 defining between them a closed space 39 which is filled with an expansible fluid. The upper margin of the inner shell 38 is secured leak-tight to the upper spring abutment 7ᵇ fixed to the valve stem 7ª. The space 39 communicates, by means of a flexible conduit 40, preferably having a protective covering 41, with the interior 42 of a bulb 43, the interior 42 of the bulb and the conduit 40 also being filled with expansible fluid so that when the bulb is exposed to changes in external temperature or pressure, the fluid in the interior of the bulb will vary in volume and thus cause expansion or contraction of the bellows 38 and consequent movement of the valve stem.

The automatically acting pressure motor as just described may be of conventional type and its mode of actuating the valve may not be substantially different from that in common use in valves of this general type.

However, if for any reason this automatic operation of the valve should fail, with the pilot valve held closed by the spring S, thus leaving the balanced main valve closed, it is possible, by the arrangement of the present invention, to cause the main valve to open and remain open for such period as may be necessary while restoring the automatic actuating means to operating condition. Thus, if the motor means fail, the nut 29 may be rotated manually until its upper surface 34 (Fig. 2) engages the under surface of the hub 9ª. The nut may then be further rotated, thereby pulling the valve stem downwardly through the hub 9ª and thereby depressing the boss 6 of the pilot valve and opening the latter, thus permitting the main valve to open. So long as the nut 29 remains in this upper position, the valve stem is held down in opposition to the action of spring S and the main valve will remain open. Obviously the main valve may be closed by a reverse movement of the nut 29, and manual control of the main valve may thus be accomplished by use of the nut 29 so long as may be necessary. When the automatic devices have been restored to operative condition, the nut 29 may be screwed down along the part 25 until the flange 29ª engages the upper surface of the part 25, thus restoring the valve mechanism to its normal condition in which automatic control is resumed.

With the arrangement thus described the manual operation of the valve is accomplished without adding to the vertical dimensions of the valve and in the simplest possible way, and by the addition of but a single additional part (the nut 29) to the usual valve mechanism.

While one very desirable arrangement has been disclosed, it is to be understood that the invention is not necessarily limited to the precise construction herein described but is to be regarded as broadly inclusive of any and all equivalents thereof. It is further to be understood that while the valve has herein been described as of a type in which downward movement of the valve stem initiates opening of the valve, the invention is applicable to arrangements in which the valve stem moves upwardly for opening the valve. It is further to be understood that while the valve has herein been illustrated as having the bonnet disposed above the valve casing, the valve may be arranged with the bonnet disposed horizontally or below the valve casing, as may be preferred, and that when reference has been made to the "upper" and "lower" parts of the valve device, such reference has been merely for convenience in description and is not to be regarded as limiting the construction.

I claim:

1. In combination in a valve mechanism of the kind wherein a valve head cooperates with a seat to regulate the flow of fluid in a conduit and in which a valve stem is connected to motor means normally operative automatically to move the stem alternatively in the valve-opening and valve-closing directions respectively, the stem comprising two axially aligned parts having their opposed ends always substantially in contact and means uniting said parts, a valve loading spring arranged to react on one of said stem parts, a hollow spring adjusting spindle coaxial with said latter part of the stem, such spindle having therein a slot, a pin projecting from said latter stem part into the slot to prevent rotation of said stem part, an externally screw-threaded member coaxial with and fixed to said latter stem part, a nut engaging said threaded member, and a fixed abutment from which said nut is normally spaced but with which it may be engaged by axial movement of the nut relative to the stem.

2. In combination in a valve mechanism of the kind wherein a valve head cooperates with a seat to regulate the flow of fluid in a conduit and in which a valve stem is connected to motor means normally operative automatically to move the stem alternatively in the valve-opening and valve-closing directions respectively, a stem comprising two axially aligned parts having their opposed ends always substantially in contact, means preventing rotation of one of said stem parts, said latter part being provided with a coupling member uniting it to the other part of the stem, a rotary actuator having threaded engagement with said coupling member, and a fixed abutment with which said actuator may be engaged.

3. In combination in a valve mechanism of the kind in which a valve casing houses a valve seat and a valve head cooperating with the seat, to regulate fluid flow, and in which there is mounted upon the casing a bonnet comprising a rigid transverse member dividing the space within the bonnet into upper and lower portions, a valve-actuating stem extending longitudinally of the bonnet, through an aperture in said transverse member and into the valve casing, a valve-loading spring in the upper part of the bonnet, a stem-actuating pressure motor also located in said upper part of the bonnet, an externally screw-threaded member fixed to the valve stem at a point below said transverse member and within the bonnet, and a manually rotatable valve-opening element having screw-threaded engagement with said externally manually rotatable member, the screw-threaded element being normally spaced from the transverse member of the bonnet sufficiently to permit normal opening and closing of the valve but being movable into engagement with said transverse member thereby to hold the valve open, said manually rotatable element having a flange engageable with the end of said screw threaded member thereby to limit movement of the rotatable element away from the transverse member of the bonnet.

FRED G. OXLAND.

Patent No. 2,264,677.  December 2, 1941.

FRED G. OXLAND.

It is hereby certified that error appears in the printed specification of the above numbered patent requiring correction as follows: Page 3, second column, lines 39 and 40, claim 3, for "manually rotatable member, the screw-threaded element" read --screw-threaded member, the manually rotatable element--; and that the said Letters Patent should be read with this correction therein that the same may conform to the record of the case in the Patent Office.

Signed and sealed this 6th day of January, A. D. 1942.

(Seal)

Henry Van Arsdale,
Acting Commissioner of Patents.